United States Patent [19]

Lisec

[11] Patent Number: 4,961,270

[45] Date of Patent: Oct. 9, 1990

[54] APPARATUS FOR DETERMINING THE SPACING BETWEEN GLASS SHEETS OF INSULATING GLASS PANES

[76] Inventor: Peter Lisec, Bahnhofstrasse 34, A-3363 Amstetten-Hausmening, Austria

[21] Appl. No.: 283,557

[22] Filed: Dec. 12, 1988

[30] Foreign Application Priority Data

Apr. 25, 1988 [AT] Austria .................................. 1050/88

[51] Int. Cl.5 .............................................. C03B 33/04

[52] U.S. Cl. ........................................ 33/833; 156/556; 198/502.2

[58] Field of Search ...................... 33/833, 832, 501.02, 33/501.03, 783, 775; 198/502.2; 156/556

[56] References Cited

U.S. PATENT DOCUMENTS 4,171,657 10/1979 Halberschmidt et al. ....... 33/1 M X
4,630,150 12/1986 Collins et al. ...................... 33/286 X
4,694,184 9/1987 Pryor ................................ 33/561 X
4,709,483 12/1987 Hembree et al. ................. 33/886 X

FOREIGN PATENT DOCUMENTS 0370706 3/1983 Austria .

*Primary Examiner*—Daniel M. Yasich
*Attorney, Agent, or Firm*—Young & Thompson

[57] ABSTRACT

In order to determine the spacing between the mutually facing inner surfaces (20, 28) of the glass sheets (1, 6) of insulating glass elements, and also the total thickness thereof, an apparatus for the assembly of insulating glass, with a conveying device (3) for a glass sheet (1) defining a reference plane (10) for one of the glass sheets (1) and with guide rollers (7, 8) defining a reference plane (11) for the second glass sheet (6), comprises tracer pins (12 and 13) which can be advanced perpendicularly to the reference plane (10, 11) into contact with the glass sheets (1, 6). Optionally electronic rulers (25, 26) are coupled with the tracer pins (12, 13), these rulers detecting the distance of the surfaces (20, 27), facing away from the reference planes (10, 11) of the one glass sheet and of the second glass sheet (1, 6). In order to determine the width of the spacer frame (5), a further tracer pin (13) is provided which can be advanced perpendicularly to the reference plane (10) into contact with a spacer frame (5) placed against the one glass sheet (1), an optionally electronic ruler (26) being coupled with this tracer pin.

5 Claims, 3 Drawing Sheets

APPARATUS FOR DETERMINING THE SPACING BETWEEN GLASS SHEETS OF INSULATING GLASS PANES

The invention relates to an apparatus for determining the distance between the mutually facing inner surfaces of the glass sheets of insulating glass elements, with a conveying device for the glass sheets defining at least one reference plane for at least one of the glass sheets, with backup rollers, defining the at least one reference plane, for a glass sheet.

In the manufacture of insulating glass filled with a special gas (e.g. sulfur hexafluoride or the like), it is necessary to determine the volume of the inner space (air interspace) bounded by the two glass sheets and the spacer frame so that the amount of filled-in special gas can be dosed in correspondence with the volume of the air interspace. The volume of the air interspace can be determined from the (known) dimensions for length and width of an insulating glass element and from the distance of the mutually facing inner surfaces of the glass sheets of the insulating glass element. However, thus far problems were encountered in determining the mutual spacing of the aforementioned inner surfaces.

Knowledge of the spacing of the inner surfaces of the two glass sheets of an insulating glass element is also of significance for controlling automatic sealing machines (size of the marginal joint).

The invention is based on the object of providing an apparatus of the above-discussed type which can be readily integrated into an insulating glass manufacturing line without affecting the cycle times of such a facility and which makes it possible to detect, preferably in a fully automatic fashion, the variables required for determining the spacing between the mutually facing inner surfaces of the glass sheets of insulating glass elements, and to pass such variables on to a computer.

In attaining this object, an apparatus of the type discussed hereinabove is characterized, in accordance with this invention, by the features that a tracer pin is provided that can be advanced perpendicularly to the reference plane into contact with the glass sheets, and that an electronic ruler is coupled with the tracer pin, this ruler detecting the distance of the forward end of the tracer pin from the reference plane and thus the spacing of the surfaces of the glass sheets facing away from the reference plane.

Additional features and details of the invention can be seen from the following description of a preferred embodiment of the apparatus according to this invention, as illustrated in the drawings wherein.

Figure 1:
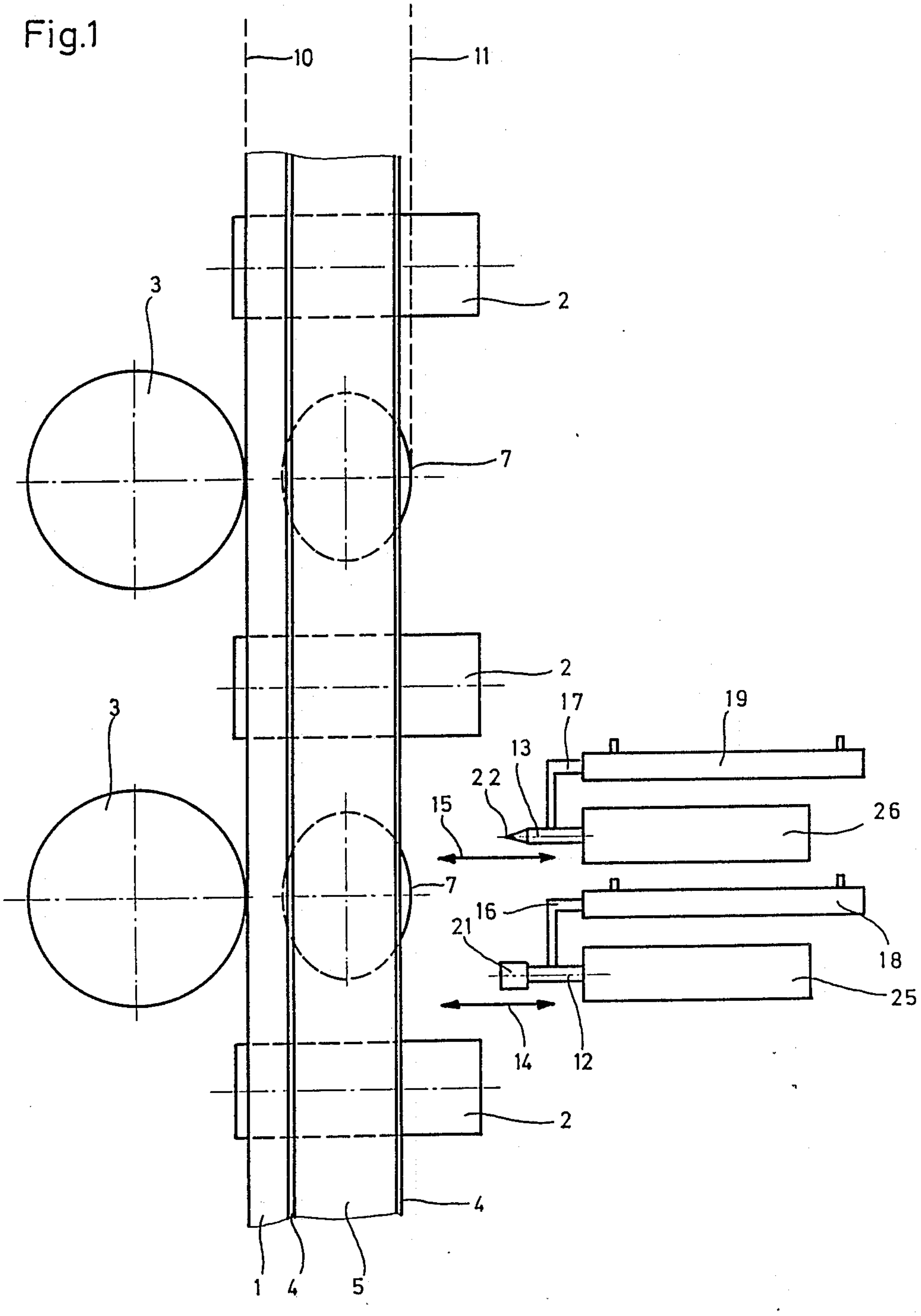
FIG. 1 is a top view of the essential parts of the apparatus.

The apparatus according to the invention is installed with special advantage in an assembly station for insulating glass as known, for example, from Austrian Patent No. 370,706. In this conventional facility, a first glass sheet 1 is conveyed into the assembly station while standing on conveyor rollers 2 and resting with its outer surface against backup rollers 3 of an array of backup rollers. At this point, a spacer frame 5, provided with an application of putty 4 on both sides, is placed manually or by means of an appropriate device onto the glass pane 1. However, the spacer frame 5 can also be placed, manually or automatically, against the glass sheet 1 in a device arranged upstream thereof. Now the array of backup rollers with the backup rollers 3, and the conveying rollers 2, are displaced rearwardly approximately by the thickness of the spacer frame 5 and a second glass pane 6 is transported while standing on the conveying rollers 2 into a position wherein it covers the first glass pane 1, which latter has been lifted off the conveying rollers 2 by means of lifting members, not shown. During the feeding of the second glass pane 6, the latter is guided at a spacing from the spacer frame 5 by means of guide rollers 7 and 8 which preferably exhibit the shape of truncated cones. During assembly of the two glass panes 1 and 6 into an unfinished insulating glass member, the guide rollers 8, mounted on a joint beam, are lifted out of the upper marginal zone of the glass sheet 6 so that the latter comes into contact with the applied putty 4 of the spacer frame 5 at least in its upper region. At this point the array of backup rollers is again moved forward and the unfinished insulating glass member is conveyed further to a press, e.g. to a press of the type of structure known from Austrian Patent No. 385,499.

The aforementioned device for emplacing spacer frames can be of the type of structure known from Austrian Patent No. 384,607 or German Patent No. 3,223,848, for example.

It is to be pointed out additionally that the apparatus according to this invention can also be made an integral part of an assembly station of the construction known from Austrian Patent No. 370,201.

Figure 2:
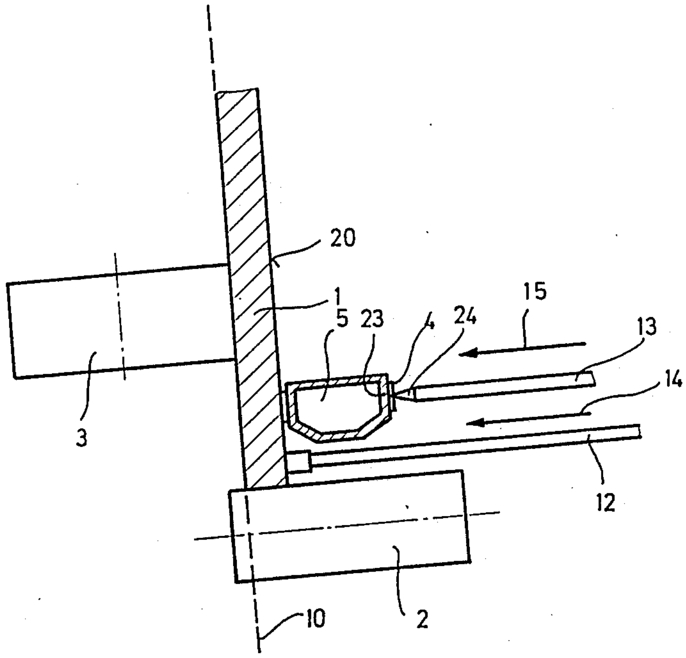
FIG. 2 shows in a lateral view the apparatus during the first measuring process.

It can be seen from the illustration of FIG. 2 that the backup rollers 3 of the backup roller array define a first reference plane 10. In order to provide particularly precise guidance for the glass sheet 1 in the zone of its lower edge wherein its thickness will be determined later on, additional cylindrical backup rollers can be arranged at that location.

Figure 3:
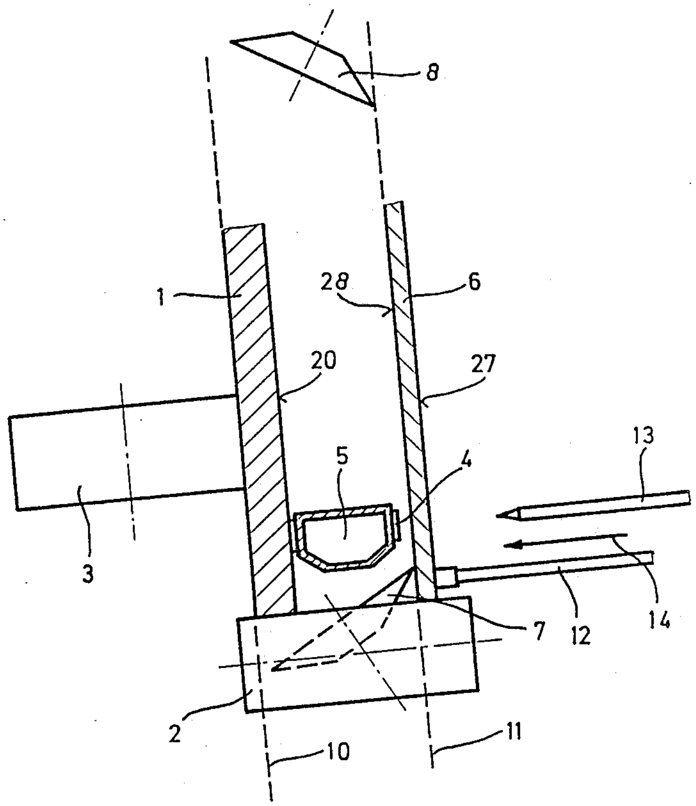
FIG. 3 shows the apparatus during the second measuring process.

The guide rollers 7 and 8 define (see FIG. 3) a second reference plane 11 for the second glass sheet 6.

As can be derived from FIG. 1, two tracer pins 12 and 13 are provided in the apparatus, these pins being displaceable in the direction of double arrows 14 and 15, respectively, perpendicularly to the reference planes 10 and 11. For this purpose, the tracer pins are coupled with the piston rods 16 and 17, respectively, of pressure medium cylinders 18 and 19, respectively.

As can be seen from FIG. 2, the tracer pin 12 is movable into contact with the facing surface 20 of the glass sheet 1 resting against the backup rollers 3 (FIG. 2). At its forward end, the tracer pin 12 carries a head 21.

The tracer pin 13, as can likewise be seen from FIG. 2, can be advanced in the direction of arrow 15 into contact with the sidewall 23 of the spacer frame 5 facing the pin. The tracer pin 13 exhibits a tip 24 at its forward end penetrating the layer of adhesive 4 applied to the wall 23 of the spacer frame 5, which layer consists of butyl rubber, for example, when the tracer pin 13 is advanced toward the spacer frame 5.

An electronic ruler 25 is associated with the tracer pin 12 and measures the distance of the forward end surface of its head 21 from the reference plane 10. An electronic ruler 26, associated with the tracer pin 13, measures the distance of the tip 22 from the reference plane 10.

In this way, after advancing the tracer pin 12 into contact with the surface 20 of the glass sheet 1, the distance of the latter from the reference plane 10 and accordingly the thickness of the glass sheet 1 can be measured. Analogously, with the aid of the tracer pin 13, the distance of the facing lateral surface of the wall 23 of the spacer frame 5 from the reference plane 10 and, consequently (after deducting the thickness of the glass sheet 1), the width of the spacer frame 5 proper can be measured.

After determining the thickness of the glass sheet 1 and the width of the spacer frame 5 as described above, the tracer pins 12 and 13 are again retracted into their initial position (FIG. 1) and, as described above, the second glass sheet 6 is introduced into a position wherein it covers the glass sheet 1. At this point, the tracer pin 12 is again advanced, and the spacing of the outer surface 27 of glass sheet 6 from the reference plane 11 is determined, based on the distance of the forward end surface of the head 21 of the tracer pin 12 from this reference plane 11.

On the basis of the thus-determined data, the thickness of the glass sheets 1 and 6 as well as the width of the spacer frame 5 and the mutual spacing of the two inner surfaces 20 (glass sheet 1) and 28 (glass sheet 6) in the assembled insulating glass can be determined.

If, in case of an insulating glass assembled in the aforedescribed apparatus with two reference planes 10 and 11, a pressing step is performed in the subsequently arranged pressing device to a predetermined dimension of the thickness (mutual spacing of the outer surfaces of the glass sheets) of the insulating glass element, then it is sufficient to detect, with the aid of the tracer pin 12, the thickness of the two glass panes 1 and 6 and to subtract these values for the thickness from the value of the outer thickness of the insulating glass element after the pressing step, which after all is known from the setting of the pressing device, in order to determine the thickness of the air interspace.

In contrast thereto, if the pressing device is controlled so that the operation is directed toward a predetermined extent of reduction in the thickness of the two stripes 4 of butyl rubber provided on the spacer frame 5, then it is necessary to determine, with the aid of tracer pin 13, also the width of the spacer frame 5.

The apparatus of this invention can also be utilized in devices for the assembly of insulating glass exhibiting merely one reference plane, namely reference plane 10. In this case, with the aid of tracer pin 12, the thickness of the glass sheet 1 is first determined and, with the aid of tracer pin 13, the width of the spacer frame 5 is found, and then, after the second glass sheet 6 has been placed on the spacer frame 5, the distance of the outer surface 27 of the glass sheet 6 from reference plane 10 is determined. Based on the thus-detected values, the width of the air interspace, i.e. the distance between the inner surfaces 20 and 28 of the glass sheets 1 and 6, respectively, can be calculated.

If the dual function of the tracer pin 12 is to be avoided, then a further tracer pin can be included which is coupled with a ruler and which can be advanced toward the second glass sheet 6 in order to determine the spacing of the latter from a reference plane (e.g. plane 11). Such a tracer pin can also be provided downstream of the pressing device.

I claim:

1. Apparatus for determining the distance between mutually facing inner surfaces of a pair of parallel glass sheets of an insulating glass element having a spacer frame between the sheets, comprising a tracer pin advanceable into contact with a side surface of a said glass sheet having a said spacer frame on said surface, said first tracer pin moving perpendicularly to said surface, a second tracer pin spaced from said first tracer pin and movable parallel to the direction of movement of said first tracer pin into contact with said spacer frame prior to the application of a second said glass sheet against said spacer frame, and means for detecting the difference in the distance of advance of said first and second tracer pins into contact respectively with said sheet and said frame, thereby to determine the thickness of said frame.

2. Apparatus as claimed in claim 1, and means for conveying said sheets on edge past said pins.

3. Apparatus as claimed in claim 2, said conveying means comprising rollers against which a lower edge of said glass sheet rolls and against which a side surface of said glass sheet opposite said side surface contacted by said first pin is movably supported.

4. Apparatus as claimed in claim 1, said difference detecting means comprising electronic rulers one for each said pin.

5. Apparatus as claimed in claim 1, said pins being movable simultaneously.

* * * * *